(12) United States Patent
Chen et al.

(10) Patent No.: US 8,744,091 B2
(45) Date of Patent: Jun. 3, 2014

(54) INTELLIGIBILITY CONTROL USING AMBIENT NOISE DETECTION

(75) Inventors: Shaohai Chen, Cupertino, CA (US); Guy C. Nicholson, Cupertino, CA (US); Bruce C. Po, Foster City, CA (US)

(73) Assignee: Apple Inc., Cupertino, CA (US)

( * ) Notice: Subject to any disclaimer, the term of this patent is extended or adjusted under 35 U.S.C. 154(b) by 516 days.

(21) Appl. No.: 12/945,698

(22) Filed: Nov. 12, 2010

(65) Prior Publication Data

US 2012/0121096 A1 May 17, 2012

(51) Int. Cl.
H03G 3/20 (2006.01)

(52) U.S. Cl.
USPC .............................. 381/57; 381/104; 381/106

(58) Field of Classification Search
USPC .............................. 381/57, 104, 106, 107, 108
See application file for complete search history.

(56) References Cited

U.S. PATENT DOCUMENTS

| 4,641,344 | A | | 2/1987 | Kasai et al. |
|---|---|---|---|---|
| 5,012,519 | A | * | 4/1991 | Adlersberg et al. ........... 704/226 |
| 5,696,647 | A | * | 12/1997 | Phan et al. .................. 360/78.07 |
| 6,094,481 | A | | 7/2000 | Deville et al. |
| 7,526,428 | B2 | | 4/2009 | Chamberlain |
| 8,116,481 | B2 | * | 2/2012 | Christoph .................... 381/94.7 |
| 8,218,783 | B2 | * | 7/2012 | Katzer et al. ................. 381/73.1 |
| 2002/0172374 | A1 | | 11/2002 | Bizjak |
| 2003/0198357 | A1 | * | 10/2003 | Schneider et al. .......... 381/94.2 |
| 2005/0283749 | A1 | | 12/2005 | Yeh |
| 2006/0251261 | A1 | | 11/2006 | Christoph |
| 2007/0253577 | A1 | | 11/2007 | Yen et al. |
| 2008/0013751 | A1 | * | 1/2008 | Hiselius ....................... 381/102 |
| 2008/0025538 | A1 | | 1/2008 | Zad-Issa |
| 2008/0317260 | A1 | | 12/2008 | Short |
| 2010/0080379 | A1 | | 4/2010 | Chen et al. |
| 2010/0158263 | A1 | | 6/2010 | Katzer et al. |
| 2010/0202631 | A1 | | 8/2010 | Short |

FOREIGN PATENT DOCUMENTS

| EP | 0602826 B1 | 6/1994 |
|---|---|---|
| EP | 0767570 A2 | 4/1997 |
| EP | 0767570 B1 | 7/2004 |
| JP | 09135194 | 5/1997 |
| JP | 2000165484 | 6/2000 |
| JP | 2007110320 | 4/2007 |

(Continued)

OTHER PUBLICATIONS

The Netherlands Search Report and Written Opinion (dated Mar. 20, 2012), Application No. 2007764, Date Filed—Nov. 10, 2011, (10 pages).

(Continued)

Primary Examiner — Xu Mei
Assistant Examiner — William A Jerez Lora
(74) Attorney, Agent, or Firm — Blakely, Sokoloff, Taylor & Zafman LLP

(57) ABSTRACT

A communications device is configured to control the intelligibility of speech in a downlink voice signal during a call. The device determines a current noise level based on sampling ambient acoustic noise and based on a previously determined noise level. The device then determines an overall output gain and a frequency response based on the current noise level and based on a user-selected volume setting of the device. The device modifies the downlink voice signal during the call in accordance with the determined overall output gain and the determined frequency response. Other embodiments are also described and claimed.

24 Claims, 12 Drawing Sheets

(56) References Cited

FOREIGN PATENT DOCUMENTS

| JP | 2008228184 | 9/2008 |
|---|---|---|
| KR | 1020050017579 A | 2/2005 |
| WO | WO-97/38488 | 10/1997 |

OTHER PUBLICATIONS

European Search Report (dated Jun. 2, 2012), International Application No. 11188446.6-2225, Date Filed —Nov. 9, 2011, (7 pages).

PCT International Search Report and Written Opinion (dated Mar. 8, 2012), International Application No. PCT/2011/059811, International Filing Date —Nov. 8, 2011), (13 pages).

JP Office Action (dated May 1, 2013), Application No. 2011-262917, Date Filed —Nov. 11, 2011, 2 pages.

KIPO's Notice of Preliminary Rejection (dated Jan. 24, 2013), Korean Patent Application No. 10-2011-118288, Date Filed, 6 pages.

PCT International Preliminary Report on Patentability (dated May 23, 2013), International Application No. PCT/2011/059811, International Filing Date —Nov. 8, 2011), (12 pages).

TW Office Action with Search Report (dated Jan. 13, 2014), ROC (Taiwan) Patent Application No. 100141335, Date Filed—Nov. 11, 2011, (7 pages).

* cited by examiner

| Volume | EQ |
|---|---|
| 1 | ct_rx_nominal_eq |
| 2 | ct_rx_nominal_eq |
| 3 | ct_rx_nominal_eq |
| 4 | ct_rx_nominal_eq |
| 5 | ct_rx_nominal_eq |
| 6 | ct_rx_nominal_eq |
| 7 | ct_rx_nominal_eq |
| 8 | ct_rx_nominal_eq |
| 9 | ct_rx_nominal_eq |
| 10 | ct_rx_nominal_eq |
| 11 | ct_rx_nominal_eq |
| 12 | ct_rx_maximum_eq |
| 13 | ct_rx_maximum2_eq |
| 14 | ct_rx_maximum3_eq |
| 15 | ct_rx_maximum4_eq |
| 16 | ct_rx_maximum5_eq |

FIG. 11

EQ coefficients list

Nominal ptr → ct_rx_nominal_eq
ct_rx_maximum_eq
ct_rx_maximum2_eq
ct_rx_maximum3_eq
ct_rx_maximum4_eq
ct_rx_maximum5_eq

FIG. 12

EQ coefficients list

Nominal ptr → ct_rx_nominal_eq
ct_rx_maximum_eq
ct_rx_maximum2_eq
ptr + offset → ct_rx_maximum3_eq
ct_rx_maximum4_eq
ct_rx_maximum5_eq

FIG. 13

INTELLIGIBILITY CONTROL USING AMBIENT NOISE DETECTION

An embodiment of the invention relates to improving a user's experience of downlink audio in a communications device. Other embodiments are also described.

BACKGROUND

Real-time two-way communication (which may be not just audio only, but also audio and video) can be carried out between two electronic communication devices that are generically referred to here as telephony devices. Such devices have evolved over the years from simple plain old telephone system (POTS) analog wire line stations to cellular network phones, smart mobile phones, voice over IP (VOIP) stations, and desktop and laptop personal computers running VOIP applications. There is a desire to remain backwards compatible with the original, relatively small bandwidth allocated to a voice channel in a POTS network. This in part has prevented the emergence of a "high fidelity" telephone call, despite the availability of such technology.

Modern telephony devices such as smart phones support not only voice communications over a voice channel, but also multimedia services, such as real time audio, video chat, and mobile TV, over a data channel. Improving the sound quality of a downlink audio signal is particularly desirable for smart phones as they may be more susceptible to electromagnetic interference, due to their reliance on cellular wireless links. In addition, smart phones are often used in noisy sound environments, such as outside in the wind or near a busy highway or a crowded people venue.

Smart phones have several stages of audio signal processing that are applied to the downlink audio signal, which is received from the communications network (before the signal is audiblized to a near-end user of the device through a speaker). In addition, signal processing algorithms have been developed to improve the intelligibility of the far-end user's speech contained in the downlink audio signal, when the near-end user is in areas of high ambient noise. Typically, the near-end user will manually adjust the volume, press the device closer to her ear, or wear a headset to overcome ambient noise while receiving the downlink audio signal. An intelligibility boost algorithm will help by automatically adjusting an equalization filter in order to increase the gain at high frequency components relative to the low frequency components of the downlink speech as a function of either a measured ambient noise level or the current user-selected volume setting. This will make the speech more intelligible (albeit slightly artificial sounding).

SUMMARY

In accordance with the embodiments of the invention, a user-selected volume setting and ambient acoustic noise samples may be used together to modify a downlink voice signal during a call to control its intelligibility. The sampled ambient acoustic noise and a previously stored noise level are used to determine a current noise level. Using both the user-selected volume setting and the current noise level, an overall output gain and a frequency response may be determined. During the call, the downlink voice signal is modified by adjusting its frequency response characteristics in accordance with the determined frequency response. The downlink audio signal is also modified by adjusting its overall loudness in accordance with the determined overall output gain. This may enable the speech that is in the downlink voice signal to remain intelligible despite widely varying ambient noise levels during the call and without requiring the user to make many adjustments to the volume setting.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Embodiments of the invention will now be described with reference to the drawings summarized below. The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 11 is a table of frequency response coefficients list pointer values corresponding to each user-selected volume setting.

FIG. 12 is a frequency response coefficients list.

FIG. 13 illustrates a resulting pointer when a pointer offset is added to the pointer value corresponding to the user-selected volume setting.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
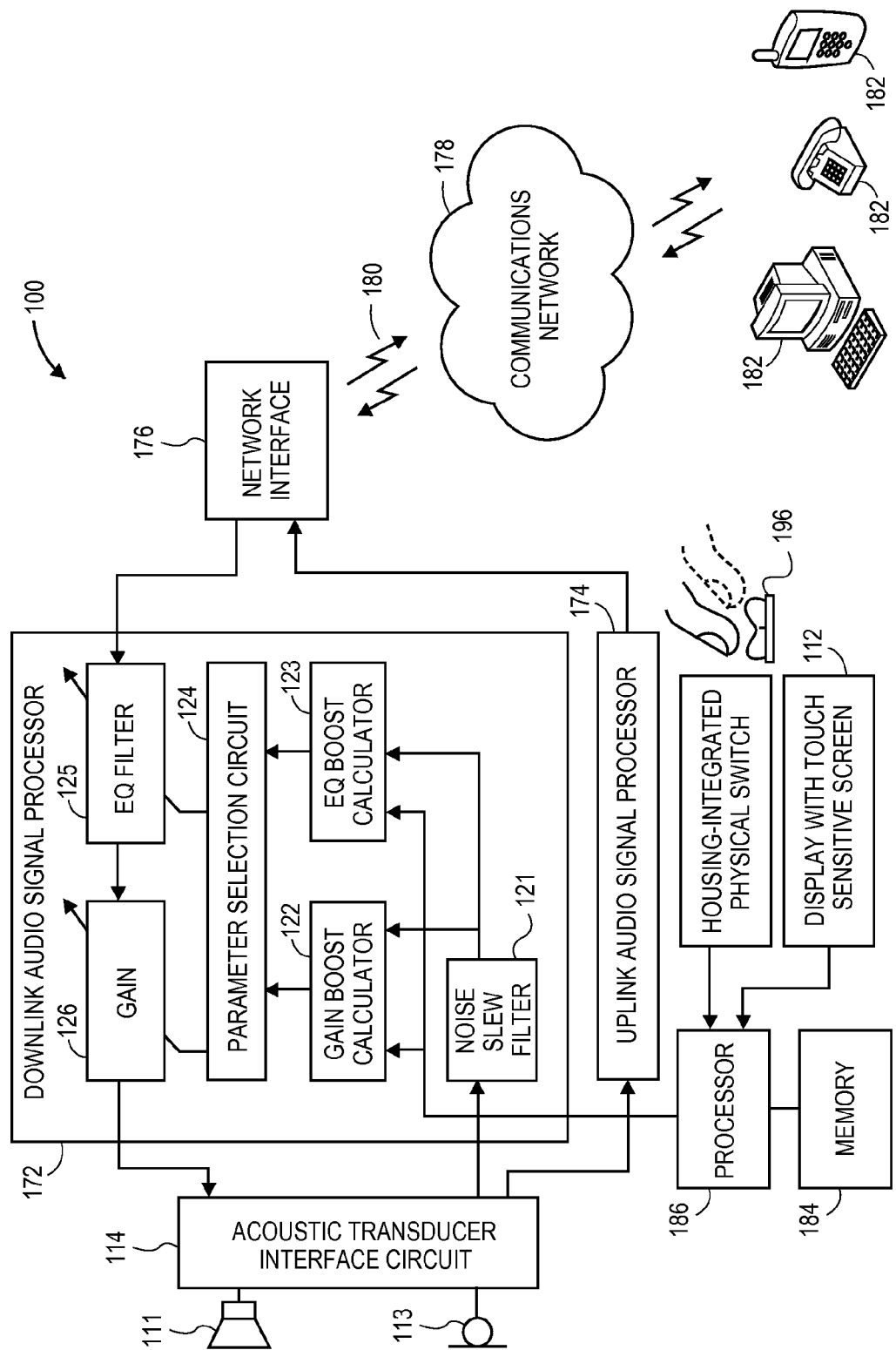
FIG. 1 is a block diagram of a communications device with intelligibility processing.

FIG. 1 is a block diagram of an example communications device. The device 100 has a housing (not shown) in which are integrated components depicted in FIG. 1. An acoustic transducer interface circuit 114 is to feed a downlink audio signal to a speaker 111. The acoustic transducer interface circuit 114, which may be implemented in part within an audio codec integrated circuit device, may have a digital to analog converter followed by an audio amplifier, to convert the digital downlink audio signal into an analog speaker driver signal at an output of the interface circuit 114. Alternatively, the acoustic transducer interface circuit 114 may simply buffer and connect the digital audio signal to a headset (e.g., using Bluetooth compliant interface circuitry, and digital microphone circuitry of a wired headset). The downlink signal is provided by a downlink audio signal processor 172 having an input coupled to a communications network 178.

The acoustic transducer interface circuit 114 is to feed an audio signal from a voice pickup device or a microphone 113 to an uplink audio signal processor 124. For this function, the interface circuit 114, may have an analog to digital converter that converts the analog output signal from a connected microphone 113 into digital form. Alternatively, the interface circuit 114 may simply buffer a digital microphone signal from a digital, wireless or wired headset (e.g., using a Bluetooth wireless headset chipset or a digital microphone chipset). The uplink audio signal processor 174 enhances the quality of the uplink audio signal before sending it to the communications network 178.

The speaker 111 may be a loudspeaker used in speakerphone mode, or it may be an earpiece speaker or receiver, both of which would be integrated in the communications device housing. The microphone 113 may be a microphone integrated in the communications device housing. As an alternative, the speaker 111 and microphone 113 may be integrated in a headset (not shown). The headset, which may be a wired or wireless headset, would be connected to receive downlink audio and send uplink audio through an appropriate headset interface circuit (not shown) in the interface circuit 114.

The device 100 includes a processor 186. The processor 186 may run a telephony application program stored in memory 184. The processor 186 may also run a program that provides a volume setting (a control signal) by decoding the user's actuation of any one of a variety of different volume control or adjust buttons (and their associated switches or mechanical to electrical transducers) into the specific volume settings (e.g., from a housing-integrated physical switch 196). The program may keep track of the current volume setting as a stored data variable, and then update the current setting based on the next detected switch actuation. Alternatively, the processor 186 may run a software component that reads touch events on a display with a touch sensitive screen 112, representing actuation of a virtual volume button. The volume setting may alternatively be read from a physical switch that is located in the microphone housing of a wired headset (not shown). The headset may be connected to the (host) device 100 through a standard headset jack (not shown). In that case, a wired headset interface of the device 100 contains part of a chipset that detects or reads the switch through the microphone bias line, and then provides this information to the processor 186. In yet another embodiment, the volume setting may be read from a physical switch that is integrated in a wireless headset (not shown). For that case, a wireless headset interface of the (host) device 100 contains part of a short distance wireless interface chipset (e.g., a Bluetooth transceiver chipset) that detects or reads the switch through a wireless link with the host device 100.

The device 100 supports a two-way conversation that may be part of a voice call or a video call, collectively referred to as a call 180, that has been established between a near end user of the device 100, and a far end user of a remote device 182. The call 180 may be established and conducted through a network interface 176 of the device 100. The network interface 176 may include circuitry and software needed to, for example, place or receive the call 180 through a wire line connection with the public switched telephone network (PSTN). In another embodiment, the network interface 176 may have the circuitry and software needed to conduct the call 180 as a wireless, cellular network connection. For example, the network interface 176 may include RF communications circuitry that is coupled to an antenna, so that the near end user of device 100 can place or receive the call 180 through a wireless communications network. The RF communications circuitry may include RF transceiver circuitry and a cellular baseband processor to enable the call 180 through a cellular network. In yet another embodiment, the network interface 176 may place or initiate the call 180 using a voice over Internet Protocol (VOIP) connection, through a wired or wireless local area network.

The call 180 may be placed or initiated through a communication network 178 to which the network interface 176 is connected. Depending upon the particular type of remote device 182 used by the far end user, the communications network 178 may actually be composed of several different types of networks that cooperate with each other (e.g., via gateways, not shown) to establish and conduct the call 180. For example, the communications network 178 may include a cellular network link at the near end, followed by a back haul or PSTN segment and finally a wireless or wired local area network segment at the far end.

The downlink voice signal from the remote device 182 is received through the network interface 176 and processed by downlink audio signal processor 172 prior to being delivered to the acoustic transducer interface circuitry 114. The downlink processor 172 may include digital audio signal processing capability in the form of hardware and/or software that applies a number of quality improvement operations to the downlink voice signal from the network interface 176, including, for example, automatic gain control and/or noise suppression.

The downlink audio signal processor 172 may also include the components shown in FIG. 1 that serve to improve the intelligibility of the downlink voice signal in different ambient acoustic noise environments. A noise slew filter 121 constrains the rate at which a sampled noise sequence can change. A gain boost calculator 122 determines an overall gain based on the constrained noise sequence and based on the user-selected volume setting. An equalization (EQ) boost calculator 123 determines a frequency response based on the constrained noise sequence and based on the user-selected volume setting. A parameter selection circuit 124 selects a parameter that sets the loudness level via a gain block 126, according to the determined overall gain. The parameter selection circuit 124 also selects a set of coefficients for a digital equalization (EQ) filter 125, according to the determined frequency response. The EQ filter 125 can modify frequency response characteristics of the downlink voice signal according to the coefficients. Processing of the downlink voice signal to improve intelligibility of the far end user's speech by the downlink audio processor 172 during the call will now be described in more detail.

Figure 2:
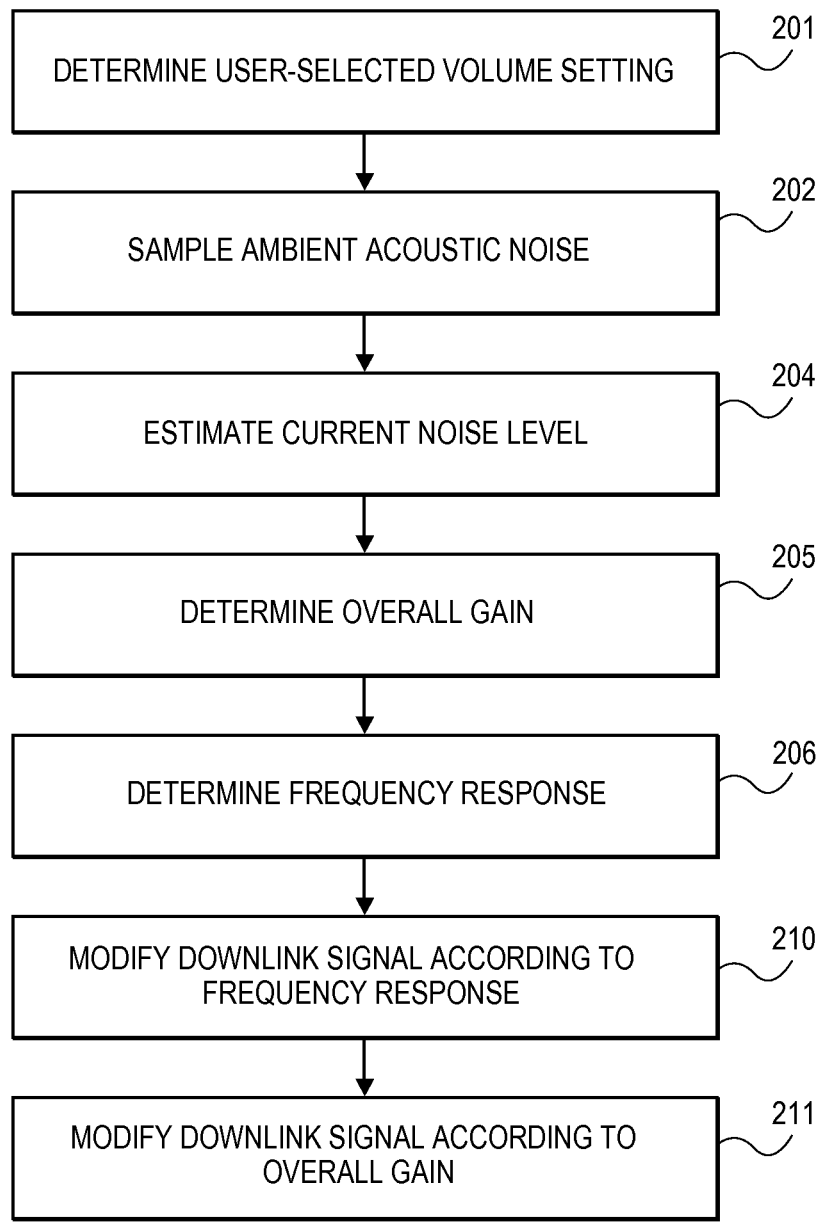
FIG. 2 is a flow chart of the intelligibility processing.

Once the call 180 has been established or connection has been made with a remote device 182, processing of the downlink voice signal by the downlink audio signal processor 172 may proceed as follows. Referring to FIG. 2, the processor 186 (or other suitable circuitry) determines the user-selected volume setting (in 201) and transmits the setting to the downlink audio signal processor 172. The acoustic transducer interface circuit 114 samples the ambient acoustic noise that is present around the near end user (i.e., in the immediate vicinity) of the device 100 and transmits a sampled ambient audio noise signal to the noise slew filter 121 (in 202). The noise slew filter 121 estimates the current noise level based on the sampled ambient audio noise and the user-selected volume setting (in 204) and transmits the current noise level to the gain boost calculator 122 and the EQ boost calculator 123. The gain boost calculator 122 determines an overall gain based on the constrained noise sequence and based on the user-selected volume setting (in 205). The EQ boost calculator 123 determines a frequency response based on the constrained noise sequence and based on the user-selected volume setting (in 206). The EQ filter 125 modifies frequency response characteristics of the downlink voice signal according to the set of coefficients selected by the parameter selection circuit 124 according to the determined frequency response (in 210). The gain block 126 sets the loudness level of the downlink voice signal according to the parameter selected by the parameter selection circuit 124 based on the overall output gain (in 211). Processing of the downlink voice signal as shown in FIG. 2 will now be described in more detail.

The acoustic transducer interface circuit 114 samples the ambient acoustic noise that is present around the near end user (i.e., in the immediate vicinity) of the device 100. The ambient acoustic noise may be repeatedly sampled during the call to obtain a sampled noise sequence. The acoustic transducer interface circuit 114 transmits a sampled ambient audio noise signal to the noise slew filter 121 (in 202). The audio samples may be raw samples, or they may be a low pass filtered version of them. The audio samples may be obtained by one or more microphones of the device 100 (e.g., a beam-steerable microphone array) via the acoustic transducer interface circuit 114. The acoustic transducer interface circuit 114 may have circuitry and software needed to extract a signal representing the ambient acoustic noise from a microphone signal that is used primarily for picking up the near end user's speech.

The acoustic transducer interface circuit 114 transmits the ambient noise signal to the noise slew filter 121. The noise slew filter may be any filter that constrains the rate at which its output, representing the sampled noise level, can increase or decrease (i.e., rate of change). The noise slew filter 121 may be used to create smoother transitions in the ambient noise level while also eliminating short term fluctuations (e.g., by including a low pass filter). Filtering the ambient noise level prevents an agitated response to brief spikes in the noise signal. For example, the slew filter 121 prevents fluctuations that may cause the overall gain (which is applied later to the downlink audio signal) to be excessive (which creates an effect known as boost pumping of the downlink audio signal). In alternative embodiments, slowing or smoothing of the noise estimate may be achieved through other possible implementations, such as averaging or infinite impulse response (IIR) recursive filters.

Figure 3:
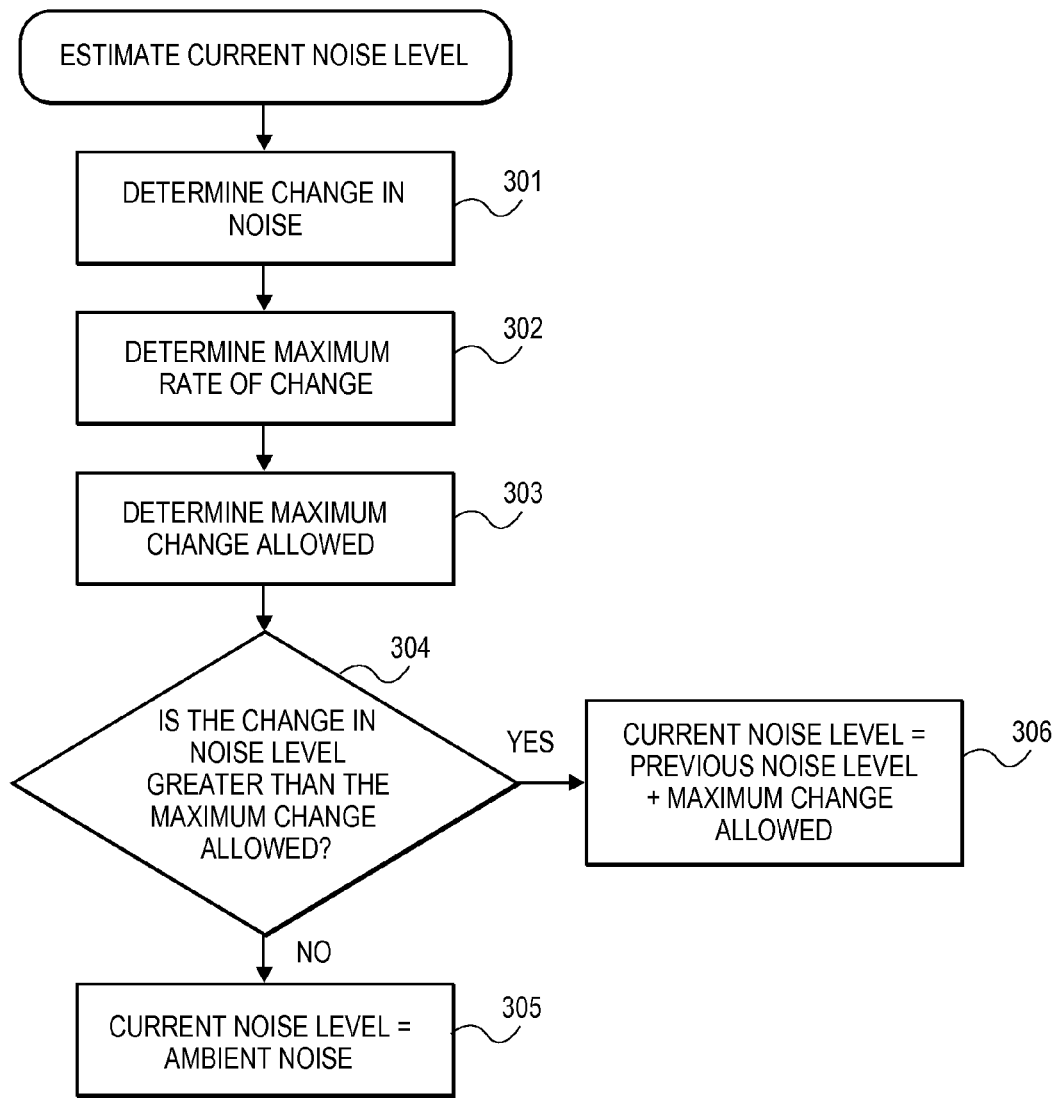
FIG. 3 is a flow chart of the slew filter of FIG. 1.

In one embodiment of the invention, the slew filter 121 estimates a current noise level from the sampled ambient acoustic noise (received at its input) and a previously estimated noise level that is stored in the slew filter 121 (in 204). Referring to FIG. 3, the slew filter 121 may estimate the current noise level by calculating a noise difference between the sampled ambient acoustic noise and the previously estimated noise level (in 301), determining a maximum rate of change that is allowed for the noise difference (in 302), determining a maximum noise difference that is allowed for the maximum rate of change (in 303), and limiting the current noise level that is output from the noise slew filter 121 if the noise difference between the sampled ambient acoustic noise and the previously estimated noise level is greater than the maximum allowed noise difference (in 304-306). Estimating the current noise level by the noise slew filter 121 will now be described in more detail.

The current noise level may be determined by first calculating the amount of change (e.g., in decibels) between the sampled ambient acoustic noise that is received at the input of the noise slew filter 121 and the previously estimated noise level, also referred to as delta noise or noise difference (in 301). A maximum rate of change that is allowed for the noise difference, or slew rate, in dB per second may also be determined (in 302). The slew rate may be a fixed value, for example, a value of +/−4 dB/s. Alternatively, the slew rate can be varied dynamically, i.e., as a function of delta noise. See, for example, the graph illustrated in FIG. 4. Dynamically determining the slew rate allows the slew rate to be made greater for legitimate large noise changes, for example, when a user steps out of a quiet car onto a busy street corner during the call. Having a fixed slew rate in this situation will cause a noticeable delay in the manner in which the overall gain applied to the downlink audio signal is increased (to compensate for the increase in ambient noise). For example, a quiet car may have 60 dBA of noise while a busy street may have 84 dBA of noise. A 24 dB change in noise that is constrained to a fixed slew rate of 4 dB/s will result in six seconds to fully respond (by changing the overall gain and EQ filter parameters), which is far too long of a delay.

Figure 4:
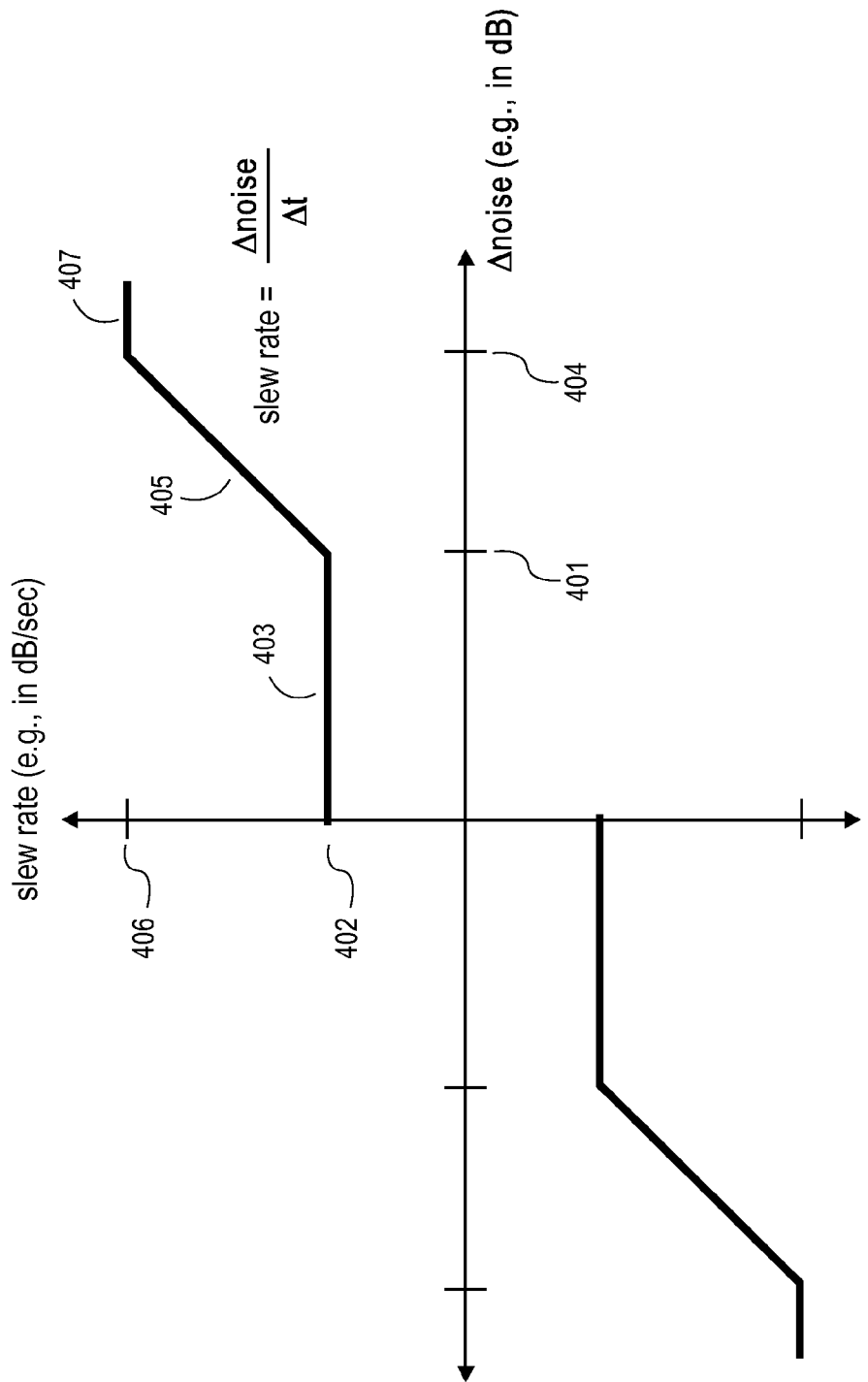
FIG. 4 is a graph of the slew rate as a function of the change in noise that is used by the slew filter of FIG. 1.

FIG. 4 shows an example of dynamically determining slew rates, for multiple delta noise ranges. For delta noise values that are less than a first predetermined threshold 401, for example, 8 dB, the slew rate may be a predetermined minimum slew rate 402, for example, 4 dB/s, as shown by graph segment 403. For delta noise values between the first predetermined threshold 401 and a second (higher) predetermined threshold 404, the slew rate may be varied as shown, such that the slew time or reaction time does not exceed a certain amount of time referred to here as delta time, for example, two seconds. The slew rate in this case would be calculated by dividing the current delta noise by the delta time. The result of this calculation is reflected in the graph segment 405. For delta noise values above the second threshold value 404, the slew rate may be a predetermined maximum slew rate 406, for example, 10 dB/s, as shown by graph segment 407. Similarly, for decreases in noise corresponding to negative delta noise values, the slew rate is negative but may follow substantially the same curve as for positive values. Dynamically determining slew rates, according to the example shown in FIG. 4, constrains the sampled noise sequence so that its rate of change is set to a low rate whenever a noise difference between two samples in the noise sequence is small, and to a high rate whenever the noise difference is large.

Referring again to FIG. 3, the slew filter 121 then determines a maximum delta noise, or a slew delta, using the newly determined slew rate (in 303). The slew delta is the newly determined slew rate multiplied by a sample period. The sample period is the amount of time that elapses between ambient acoustic noise samples that are used to determine the current noise level. For example, the acoustic transducer interface circuit 114 may be configured to convert the analog microphone pickup signal to digital audio samples at a sample rate of 8 kHz during two-way voice conversations. The transducer interface circuit 114, however, may transmit ambient acoustic noise samples to the slew filter 121 at half second intervals. In this case, the sample period of the slew filter 121 would be one half of a second. Other sample rates and sample periods are also possible if desired.

The delta noise is then compared to the slew delta (in 304) to determine if the current noise level that is output from the noise slew filter 121 needs to be limited or constrained. If the delta noise does not exceed the slew delta, the current noise level that is output by the noise slew filter 121 is the input ambient acoustic noise (in 305). If the delta noise exceeds the slew delta, the current noise level that is output by the slew filter 121 is the previous noise level plus the slew delta (in 306). The slew filter 121 thus limits the current noise level to the previous noise level plus the slew delta whenever the noise difference exceeds the slew delta (that is, whenever the noise changes are sufficiently large). The slew filter 121 then transmits the current noise level to a gain boost calculator 122 and an EQ boost calculator 123.

Figure 5:
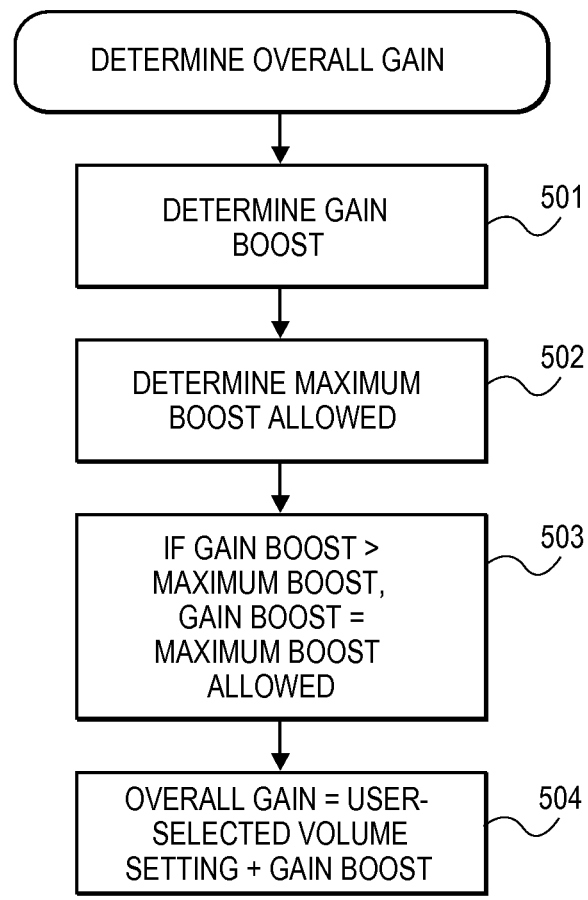
FIG. 5 is a flow chart showing the operations performed in determining an overall gain.

Referring again to FIG. 2, the gain boost calculator 122 in the downlink audio signal processor 172 is configured to determine the overall gain to be applied to the downlink voice signal based on the current noise level (i.e., the constrained noise sequence) that is received from the slew filter 121 and based on the user-selected volume setting that may be received from the processor 186 (in 205). Referring to FIG. 5, briefly, the gain boost calculator 122 determines the overall gain as follows: a gain boost to be applied to the user-selected volume setting is determined from the current noise level (in 501), a maximum boost that is allowed for the user-selected volume setting (in 502) is also determined, the gain boost is limited if it is greater than the maximum allowed boost (in 503). The gain boost calculator 122 adds the gain boost to the user-selected volume setting and outputs that as the overall gain. Determining the overall gain by the gain boost calculator 122 will now be described in more detail.

Figure 6:
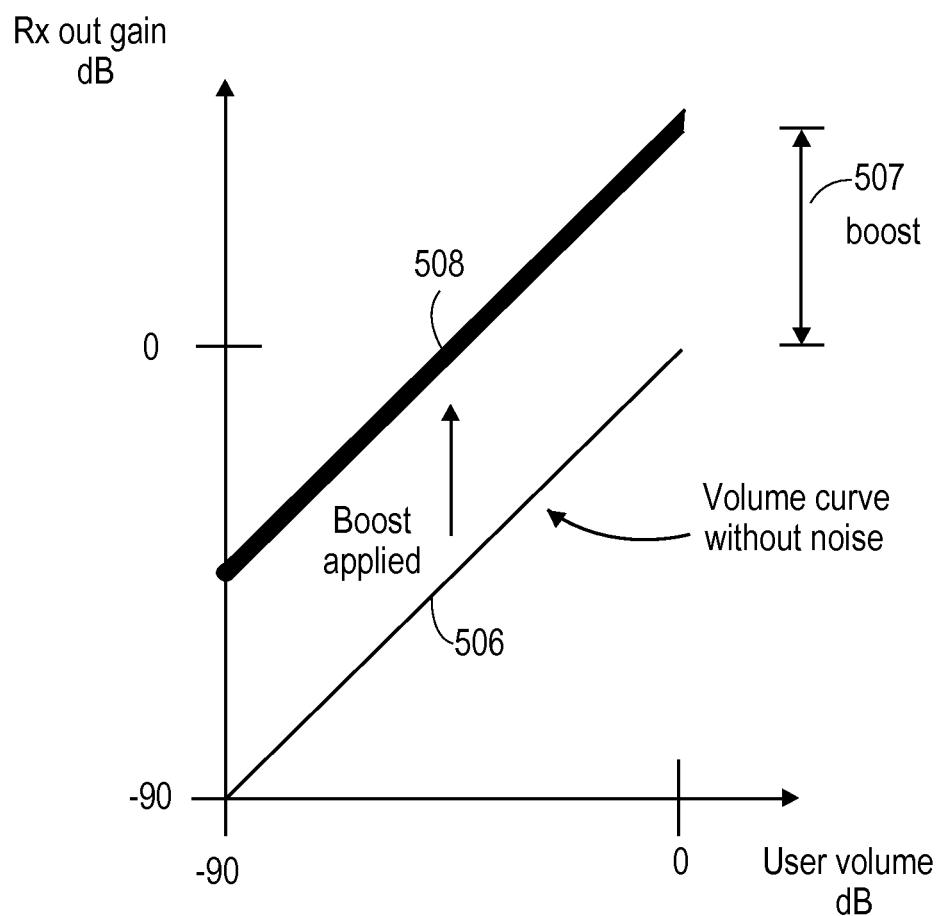
FIG. 6 is a graph illustrating a gain boost being applied to a user-selected volume setting.

The gain boost calculator 122 first determines a gain boost to be applied to the user-selected volume setting (that may be received from the processor 186) from the current noise level that is received from the noise slew filter 121 (in 501). The gain boost has the effect of modifying the volume curve corresponding to the volume setting, as shown in FIG. 6. In situations where no ambient noise is present, the gain 506 indicated by the user-selected volume setting is the output gain to be applied to the downlink voice signal. In noisy environments, a gain boost 507 is applied to the user-selected volume setting, so that the output gain of the downlink audio signal is the user-selected volume setting modified by the gain boost 507. The gain boost effectively shifts the volume curve corresponding to the user-selected volume setting upwards, as indicated by line 508.

Figure 7:
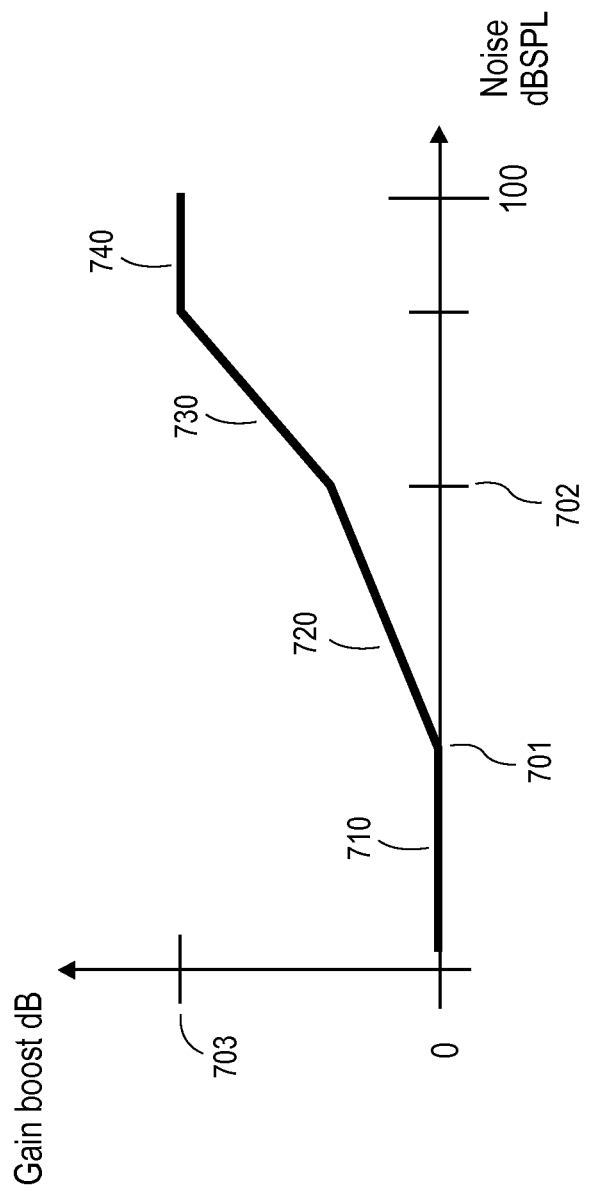
FIG. 7 is a graph of the gain boost as a function of the current noise level that is used by the gain boost calculator of FIG. 1.

The gain boost curve may take on more complicated forms, such as a multi-segmented line as shown in FIG. 7, to allow for more complex boost behavior. The graph may have multiple segments 710, 720, 730, and 740 with different boost characteristics for different noise environments. For example, no gain boost is to be applied for current noise levels that do not exceed a first threshold noise level 701, as indicated by segment 710. For current noise levels greater than the first threshold noise level 701 but not exceeding a second (higher) threshold level 702, the gain boost is a value on the segment 720 corresponding to the current noise level. For current noise levels greater than the second threshold level 702, the gain boost is a value on the segment 730 corresponding to the current noise level. Once a predetermined maximum gain boost 703 is reached, the gain boost remains at the maximum gain boost, as indicated by segment 740.

Figure 8:
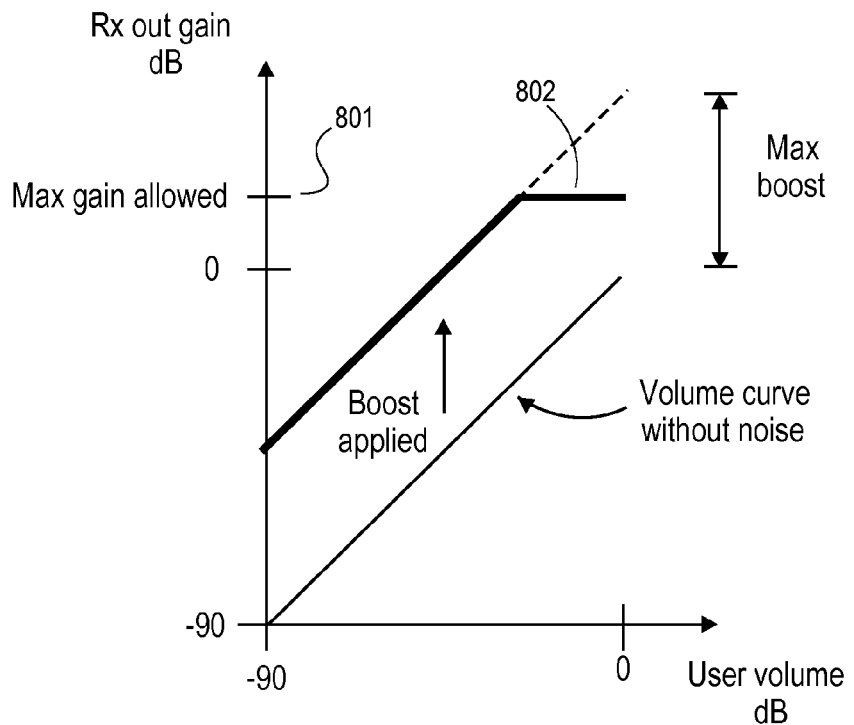
FIG. 8 is a graph illustrating the clipping effect when the overall gain reaches a maximum level.
Figure 9:
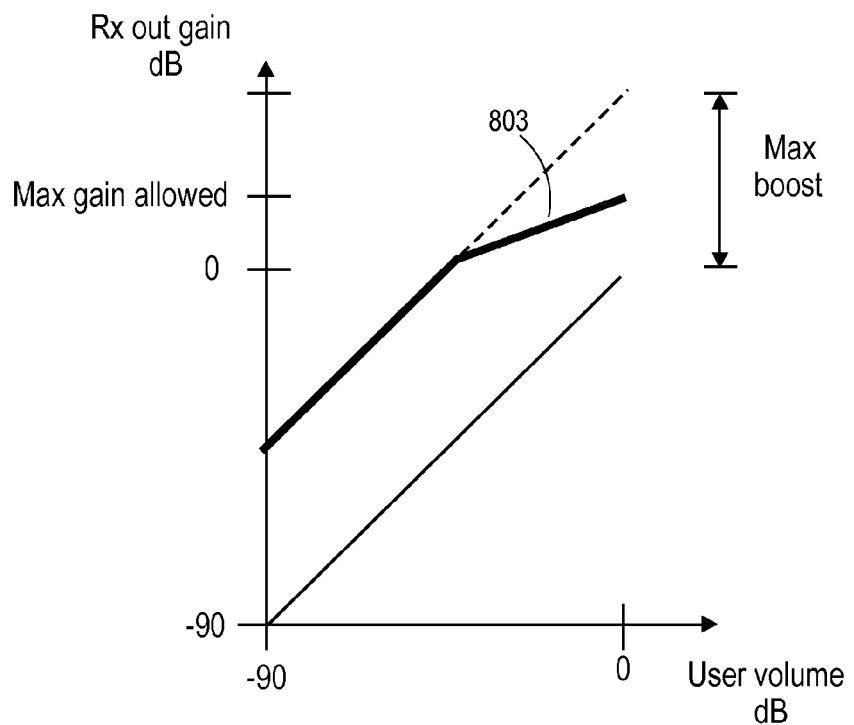
FIG. 9 is a graph illustrating the overall gain as a result of limiting the gain boost based on the user-selected volume setting.

Returning to FIG. 5, the gain boost calculator 122 may also determine a maximum boost that is allowed for the user-specified volume setting (in 502). Once the gain boost calculator 122 determines the gain boost and the maximum boost that is allowed, the gain boost is then compared to the maximum boost (in 503). If the gain boost exceeds the maximum boost, the overall gain that is output from the gain boost calculator 122 is the user-selected volume setting plus the maximum boost. Otherwise, the overall gain that is output from the gain boost calculator 122 is the user-selected volume setting plus the gain boost. Limiting the gain boost to a maximum boost based on the user-selected volume setting will allow volume settings corresponding to the highest volume levels to have a perceptible effect on the downlink voice signal when the near end user is in a noisy environment. Using FIG. 8 as an example, if the output gain of the downlink voice signal is not allowed to be above a certain level 801 due to regulations or system constraints, the gain boost will have to be clamped when the output gain of the downlink voice signal reaches the maximum level. In this situation, the top few volume levels will be flattened out in high noise environments, as indicated by line segment 802, and the near end user will have the perception that the higher volume settings have no effect. FIG. 9 shows the output gain of the downlink audio signal after limiting the gain boost in accordance with the user-selected volume setting. The gain boost is allowed to swing in response to noise, but limited by the user-selected volume setting at the higher volume levels, as shown by segment 803. Adjusting the volume setting by the near end user will then have a perceptible effect at the higher volume levels.

Figure 10:
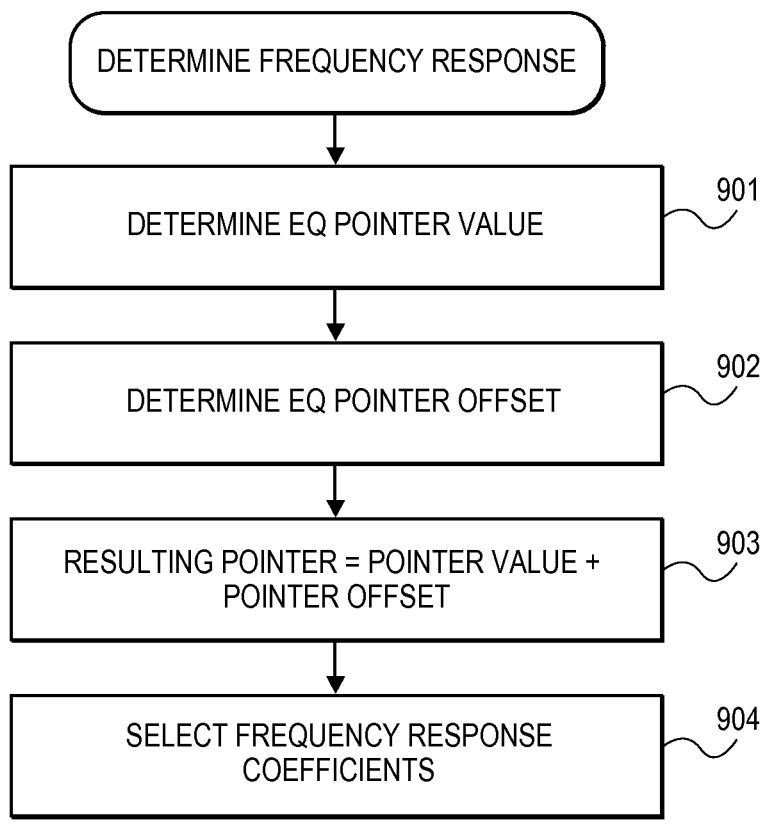
FIG. 10 is a flowchart showing the operations performed in determining the frequency response.

The EQ boost calculator 123 also receives the current noise level (i.e., the constrained noise sequence) that is output from the noise slew filter 121. Referring again to FIG. 2, the EQ boost calculator 123 in the downlink audio signal processor 172 is configured to determine, from the current noise level that is received from the noise slew filter 121, a frequency response corresponding to the current noise level and the user-selected volume setting that is received from the processor 186 (in 206). Referring to FIG. 10, the EQ boost calculator 123 determines the frequency response by determining a pointer value corresponding to the user-selected volume setting (in 901). As shown in FIG. 11, each user-selected volume setting has a pointer to a particular frequency response setting in a frequency response coefficients list of FIG. 12. The EQ boost calculator 123 also determines a frequency response offset based on the current noise level (in 902). The frequency response offset is an integer offset to the pointer. As shown in FIG. 13, the offset is added to the pointer to create a resulting pointer (in 903) that points to a frequency response setting in the frequency response coefficients list that is "higher" than the frequency response corresponding to the user-selected volume setting. For example, if the pointer for the volume setting points to a nominal frequency response and the offset is +3, the resulting pointer will point to the frequency response setting indicated by max3_eq in the coefficients list. The offset automatically boosts the intelligibility of the downlink voice signal when the user is in a noisy environment.

Figure 14:
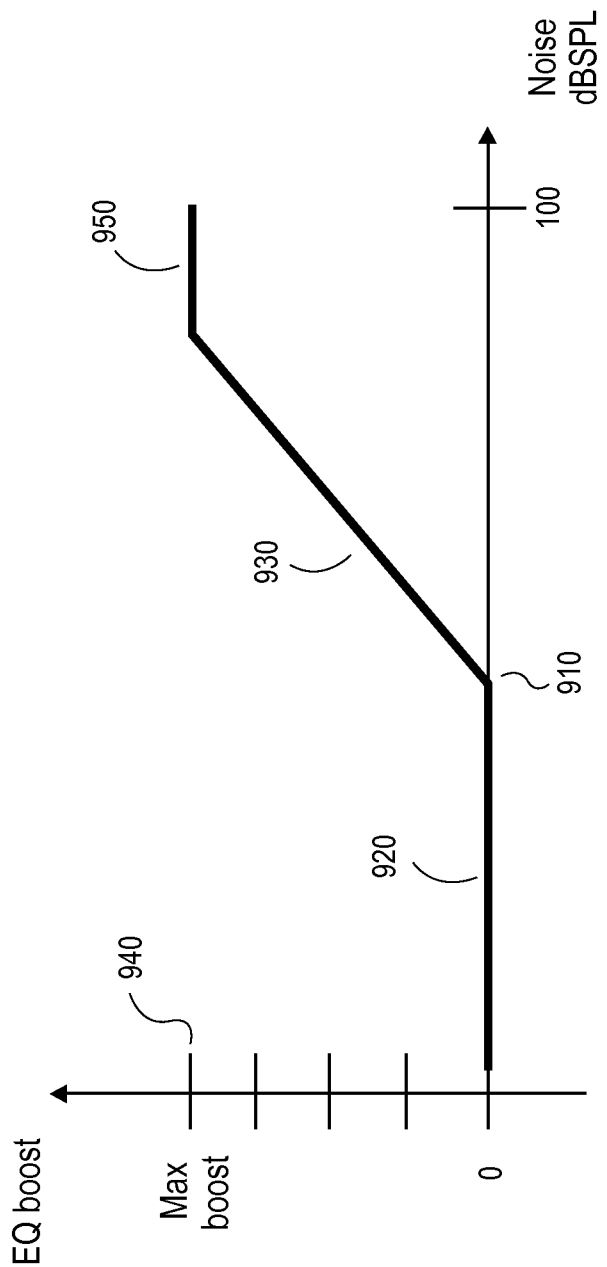
FIG. 14 is a graph of the frequency response pointer offset as a function of the current noise level.

The EQ boost calculator 123 determines the pointer offset as a function of the current noise level by, for example, the graph indicated in FIG. 14. For current noise levels not exceeding a threshold level 910, for example, 65 dB, the offset is zero, as indicated by line segment 920. For current noise levels exceeding the threshold level 910, the offset increases in integer increments in proportion to the increase in current noise level, as indicated by segment 930, until the maximum offset value 940, for example, a pointer offset of 4, is reached. For current noise levels higher than those corresponding to segment 930, the offset value remains at the maximum offset value 940, as indicated by line segment 950. The EQ boost calculator 123 then transmits the resulting pointer to the parameter selection circuit 124.

The parameter selection circuit 124 selects the parameter that sets the loudness level via the gain block 126 from a volume configuration table, according to the overall gain determined by the gain boost calculator 122. In one embodiment, the parameter selection circuit 124 may select parameters that set the overall dynamic range of the downlink voice signal via the gain block 126, according to the determined overall gain. The parameter selection circuit 124 may also select the set of coefficients for the EQ filter 125 from a frequency response coefficients list (e.g., as shown in FIG. 11), according to the frequency response determined by the EQ boost calculator 123. The set of coefficients may cause the EQ filter 125 to frequency response characteristics of the downlink voice signal and perform multi-band limiting, multi-band compression, or multi-band expansion. The volume level is then transmitted to the gain block 126, and the coefficients are transmitted to the EQ filter 125.

The EQ filter 125 responds to the frequency response coefficients received from the selection circuit 124 by modifying frequency response characteristics of the downlink voice signal in accordance with the frequency response coefficients (in 210 of FIG. 2). In one embodiment, the coefficients increase gain over a middle frequency band relative to lower and upper frequency bands. The increase in the gain of the middle frequency band may also be accompanied by simultaneous gain decreases in the lower or upper frequency bands, to maintain the overall output acoustic energy or power (of the speaker 111) about the same as that which was being delivered. Emphasizing the middle frequency band increases intelligibility of human speech being heard by the near end user through the speaker 111.

In another embodiment, the EQ filter 125 may perform multi-band limiting, multi-band compression, and/or multi-band expansion on the downlink voice signal. For multi-band limiting, the gain in a desired frequency band of the downlink voice signal is automatically attenuated or limited to some level at or near a threshold whenever the signal level in that band rises above the threshold. For multi-band compression, the gain in the desired frequency band may be reduced as needed to achieve a smooth limiting effect. For multi-band expansion, more gain is applied to the signal in the desired frequency band when the signal drops below a lower threshold. Applying multi-band limiting, multi-band compression, or multi-band expansion on the downlink voice signal may improve the perceived loudness of the downlink voice signal as it is heard by the near end user and reduce acoustic distortion in the downlink voice signal. The EQ filter 125 may then transmit the modified downlink audio signal to the gain block 126.

The gain block 126 modifies the downlink voice signal in accordance with the volume level received from the parameter selection circuit 124 (in 211). The gain block 126 may have a number of volume levels at which the speaker 111 is to be operated. The volume levels span a range, between a lowest or minimum level and a highest or maximum level. The volume level received from the selection circuit 124 corresponds to the loudness of the downlink voice signal. The gain block 126 may include a local audio amplifier that responds to the volume level by amplifying the downlink voice signal accordingly. In one embodiment, the gain block 126 may also perform overall limiting, compression, and expansion upon the downlink voice signal according to parameters received from the parameter selection circuit 124 before feeding the signal to the acoustic transducer interface circuit 114.

In one embodiment, the downlink audio signal processor 172 may include a comfort noise generator (not shown). The comfort noise generator produces artificial background noise to be added to the downlink voice signal. Adding background noise to the downlink voice signal minimizes sudden changes in sound levels and choppiness in the far end user's speech (both of which may affect the intelligibility of the far end user's speech in the downlink voice signal). The comfort noise generator may be coupled to the parameter selection circuit 124 to receive parameters selected according to the overall gain determined by the gain boost calculator 122 and the frequency response determined by the EQ boost calculator 123. The parameters may enable or disable the comfort noise generator and may set the loudness of the artificial background noise produced by the comfort noise generator. For example, the comfort noise generator may be disabled when the near end user is in an environment with high ambient noise, so that the intelligibility of the far end user's speech is not affected by the addition of artificial background noise.

Figure 15:
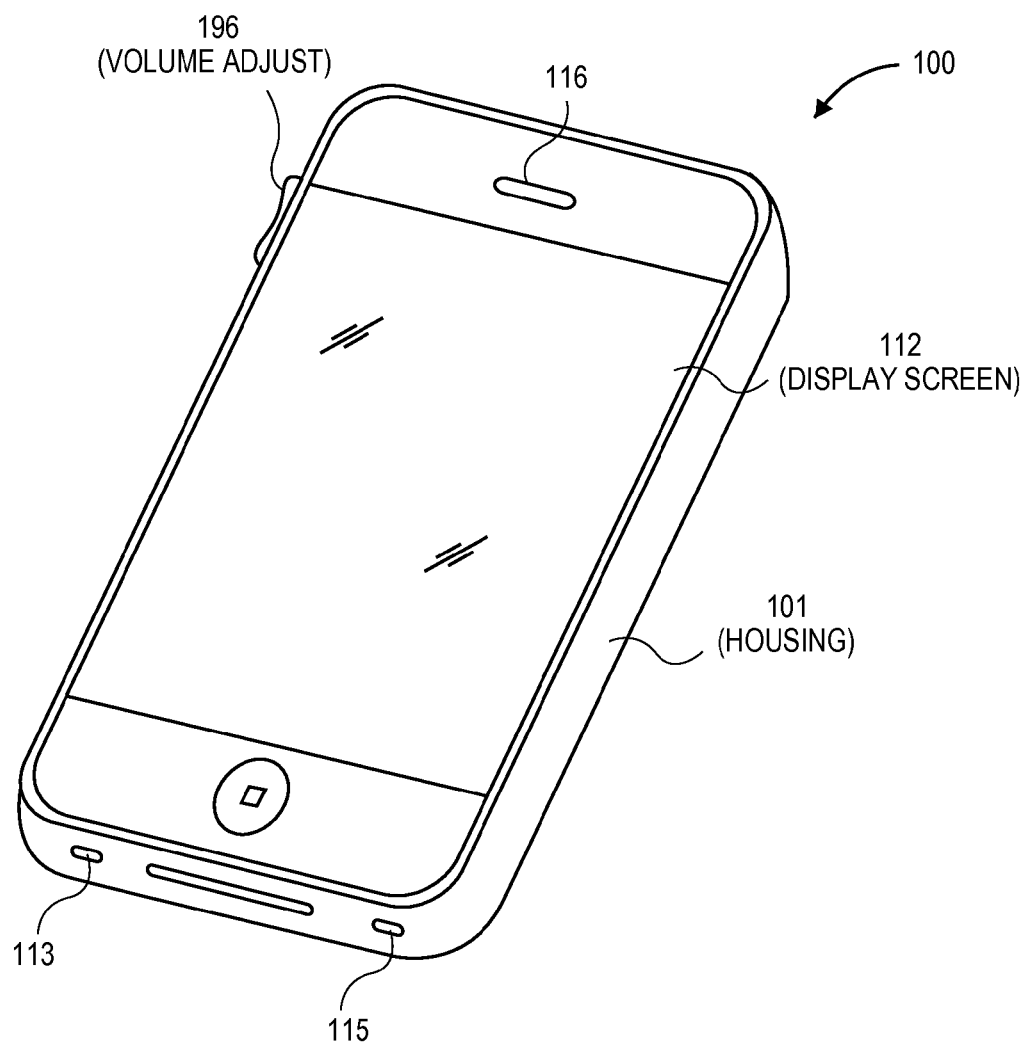
FIG. 15 is a prospective, outside view of the housing of an example mobile communications device in which the intelligibility processing capability may be implemented.

As suggested above, the embodiments of the invention may be particularly desirable in a mobile communications device, such as a mobile smart phone. FIG. 15 shows an example communications device 100, which is a mobile multi-function device or smart phone, in which an embodiment of the invention may be implemented. The device 100 has a housing 101 in which most of the components described in connection with FIG. 1 are integrated. The housing holds the display screen 112 on the front face of the device 100. The display screen 112 may also include a touch screen. The device 100 may also include one or more physical buttons, such as volume control button 196, and/or virtual buttons (on the touch screen).

The device 100 includes input-output components such as handset microphone 113 and loudspeaker 115. When the speakerphone mode is not enabled, the sound during a telephone call is emitted from earpiece or receiver 116 that is placed adjacent to the user's ear during a call in the handset mode of operation. The device 100 may also include a headset jack (not shown) and a wireless headset interface, to connect with a headset device that has a built-in microphone, allowing the user to experience the call while wearing a headset that is connected to the device 100.

The device 100 has memory 184 (shown in FIG. 1) which may include random access memory, non-volatile memory such as solid state disk storage, flash memory, and/or other suitable digital storage. There may be one or more processors that run or execute various software programs, modules, or sets of instructions (e.g., applications) that are stored in the memory 184, to perform the various functions described above. These modules or instructions need not be implemented as separate programs, but rather may be combined or otherwise rearranged in various combinations. For example, the slew filter 121 may be integrated with the uplink audio signal processor 174 or the acoustic transducer interface circuit 114. In addition, the enablement of certain functions could be distributed amongst two or more modules, and perhaps in combination with certain hardware.

To conclude, various aspects of a technique for dynamically modifying the volume and intelligibility of a downlink audio signal is described. As explained above, an embodiment of the invention may be a machine-readable medium having stored thereon instructions which program a processor to perform some of the digital signal processing operations described above including, for example, the function of the noise slew filter 121, gain boost calculator 122, the EQ boost calculator 123, and the parameter selection circuit 124. A machine-readable medium may include any mechanism for storing or transferring information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmed data processing components and fixed hardware circuit components.

For purposes of explanation, specific embodiments were described to provide a thorough understanding of the present invention. These should not be construed as limiting the scope of the invention but merely as illustrating different examples and aspects of the invention. It should be appreciated that the scope of the invention includes other embodiments not discussed in detail above. Various other modifications, changes, and variations which will be apparent to those skilled in the art may be made in the arrangement, operation, and details of the systems and methods of the present invention disclosed herein without departing from the spirit and scope of the invention as defined in the appended claims. For instance, the device 100 depicted in FIG. 1 having a telephony device with wireless call capability may be a mobile telephony device (e.g., a smart phone handset) or it may be a desktop personal computer running a VOIP telephony application program. Therefore, the scope of the invention should be determined by the claims and their legal equivalents. Such equivalents include both currently known equivalents as well as equivalents developed in the future, i.e., any elements developed that perform the same function, regardless of structure. Furthermore, no element, component, or method step is intended to be dedicated to the public regardless of whether the element, component, or method step is explicitly recited in the claims.

What is claimed is:

1. A method for modifying intelligibility of speech in a downlink voice signal during a call, comprising:
    computing a current noise level estimate based on a) sampling ambient acoustic noise during the call, and b) a previously estimated noise level, by 1) calculating a delta noise based on the sampled ambient acoustic noise and based on the previously estimated noise level, 2) determining a slew rate. 3) calculating a slew delta by multiplying the slew rate and a noise sampling period, and 4) selecting the sampled ambient acoustic noise to be the current noise level estimate when the delta noise does not exceed the slew delta;
    determining an overall output gain based on the current noise level estimate and based on a user-selected volume setting;
    determining a frequency response based on the current noise level estimate and based on the user-selected volume setting; and
    modifying the downlink voice signal during the call in accordance with the overall output gain and the frequency response.

2. The method of claim 1, wherein the slew rate is variable in that the slew rate is increased when the delta noise is greater than a threshold.

3. A method for modifying intelligibility of speech in a downlink voice signal during a call, comprising:
    computing a current noise level estimate based on a) sampling ambient acoustic noise during the call and b) a previously estimated noise level, by 1) calculating a delta noise based on the sampled ambient acoustic noise and based on the previously estimated noise level, 2) determining a slew rate, 3) calculating a slew delta by multiplying the slew rate and a noise sampling period, and 4) selecting the previously estimated noise level plus the slew delta to be the current noise level estimate when the delta noise exceeds the slew delta.

4. The method of claim 1, wherein determining the overall output gain comprises:
    determining a gain boost corresponding to the current noise level estimate; and
    selecting a volume level from a volume configuration table corresponding to the user-selected volume setting modified by the gain boost.

5. The method of claim 4, wherein determining the overall output gain further comprises:
    limiting the gain boost based on the user-selected volume setting.

6. The method of claim 1, wherein determining the frequency response comprises:
    determining a pointer offset based on the current noise level estimate;
    determining a pointer value corresponding to the user-selected volume setting; and
    selecting a set of coefficients from a coefficients list as indicated by the pointer value modified by the pointer offset, the set of coefficients corresponding to the frequency response used for modifying the downlink voice signal.

7. The method of claim 1, wherein modifying the downlink voice signal comprises:
    modifying frequency characteristics of the downlink voice signal in accordance with the frequency response; and
    modifying an overall gain of the downlink voice signal in accordance with the overall output gain.

8. An apparatus comprising:
    a communications device housing having integrated therein
    an acoustic transducer interface circuit coupled to a microphone input to sample ambient acoustic noise,
    a processor to sense a user-selected volume setting,
    a slew filter circuit having an input coupled to the acoustic transducer interface circuit, the slew filter circuit to compute a current noise level estimate based on the sampled ambient acoustic noise and based on a previously estimated noise level, wherein the slew filter circuit calculates a delta noise between the sampled ambient acoustic noise and the previously estimated noise level, determines a slew rate, calculates a slew delta by multiplying the slew rate and a noise sampling period, limits the current noise level estimate by the previously estimated noise level plus the slew delta whenever the delta noise exceeds the slew delta, and outputs the as-limited current noise level estimate,
    a gain boost calculator coupled to the slew filter circuit and the processor, the gain boost calculator to determine an overall output gain based on the current noise level estimate and based on the user-selected volume setting,
    a parameter selection circuit to select a volume level from a volume configuration table corresponding to the overall output gain, and to select a set of coefficients from a coefficients list responsive to the current noise level estimate and the user-selected volume setting,
    an EQ filter having an input to be coupled to a communications network to receive a downlink voice signal, the EQ filter to modify the downlink voice signal in accordance with the set of coefficients, and a gain module to modify an overall loudness of the downlink voice signal in accordance with the volume level.

9. The apparatus of claim 8, wherein the slew filter circuit is to vary the slew rate so that the slew rate is increased when the delta noise is greater than a threshold.

10. The apparatus of claim 8, wherein the slew rate is a first constant value for delta noise at or below a first threshold, increases for delta noise between the first threshold and a second threshold, and is a second constant value for delta noise at or above the second threshold.

11. The apparatus of claim 8, wherein the gain boost calculator determines a gain boost based on the current noise level estimate, and outputs the user-selected volume setting plus the gain boost as the overall output gain.

12. The apparatus of claim 11, wherein the gain boost calculator limits the gain boost based on the user-selected volume setting.

13. The apparatus of claim 8, further comprising an EQ boost calculator having an input coupled to the slew filter circuit and the processor, the EQ boost calculator to determine a pointer for the coefficients list based on the current noise level estimate and based on the user-selected volume setting, wherein the EQ boost calculator determines a pointer offset based on the current noise level estimate, determines a pointer value corresponding to the user-selected volume setting, and outputs the pointer value modified by the pointer offset as the pointer for the coefficients list.

14. A method for modifying intelligibility of speech that is in a downlink voice signal during a call, comprising:
repeatedly sampling ambient acoustic noise during the call to obtain a sampled noise sequence;
computing a sequence of current noise level estimates based on the sampled noise sequence, wherein the sequence of current noise level estimates is constrained in that its rate of change is reduced whenever a noise difference between a) a sampled noise level taken from the sampled noise sequence and b) a previously estimated noise level taken from the sequence of current noise level estimates is less than a threshold, and 2) increased whenever the noise difference is greater than the threshold;
determining an overall gain based on the constrained sequence of current noise level estimates and based on a user-selected volume setting;
determining a frequency response based on the constrained sequence of current noise level estimates and based on the user-selected volume setting; and
modifying the downlink voice signal during the call in accordance with the determined overall gain and the determined frequency response.

15. The method of claim 14, further comprising:
modifying a volume level of artificial background noise produced by a comfort noise generator in accordance with the determined overall gain and the determined frequency response.

16. The method of claim 14, wherein determining the overall gain comprises:
determining a gain boost based on the constrained sequence; and
selecting the overall gain from a volume configuration table corresponding to the user-selected volume setting plus the gain boost.

17. The method of claim 16, wherein determining the overall gain further comprises:
limiting the gain boost based on the user-selected volume setting.

18. The method of claim 14, wherein determining the frequency response comprises:
determining a pointer offset based on the constrained sequence;
determining a pointer value corresponding to the user-selected volume setting; and
selecting a set of coefficients from a coefficients list as indicated by the pointer value modified by the pointer offset, the set of coefficients corresponding to the frequency response used for modifying the downlink voice signal.

19. The method of claim 14, wherein modifying the downlink voice signal comprises:
modifying frequency characteristics of the downlink voice signal in accordance with the frequency response; and
modifying an overall loudness of the downlink voice signal in accordance with the overall gain.

20. The method of claim 14, wherein modifying the downlink voice signal in accordance with the determined frequency response comprises:
increasing gain over a middle frequency band relative to lower and upper frequency bands.

21. An article of manufacture comprising:
a non-transitory machine-readable storage medium having stored therein instructions that program a processor, the processor being a component of a portable communications device, to repeatedly sample ambient acoustic noise during a call to obtain a sampled noise sequence, to compute a sequence of current noise level estimates that is constrained so that its rate of change is a) decreased whenever a noise difference between a sampled noise level and a previously estimated noise level is less than a threshold, and b) increased whenever the noise difference is larger than the threshold, to determine an overall gain based on the constrained sequence and based on a user-selected volume setting, to determine a frequency response based on the constrained sequence and based on the user-selected volume setting, and to modify the downlink voice signal during the call in accordance with the determined overall gain and the determined frequency response.

22. The article of manufacture of claim 21, wherein the processor is to determine the overall gain by determining a gain boost based on the constrained sequence, selecting the overall gain from a volume configuration table corresponding to the user-selected volume setting plus the gain boost, and limiting the gain boost based on the user-selected volume setting.

23. The article of manufacture of claim 21, wherein the processor is to determine the frequency response by determining a pointer offset based on the constrained sequence, determining a pointer value corresponding to the user-selected volume setting, and selecting a set of coefficients from a coefficients list as indicated by the pointer value modified by the pointer offset.

24. The article of manufacture of claim 21, wherein the processor is to modify the downlink voice signal by modifying frequency characteristics of the downlink voice signal in accordance with the frequency response and modifying an overall loudness of the downlink voice signal in accordance with the overall gain.

* * * * *